March 17, 1953  A. G. BERGSTROM  2,631,613
SHUTOFF VALVE
Filed March 22, 1950
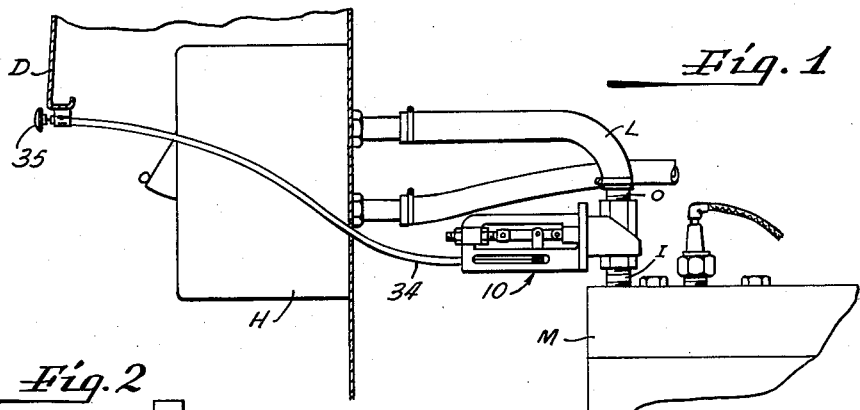
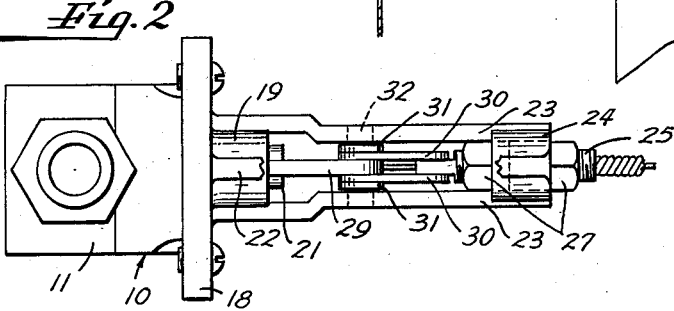
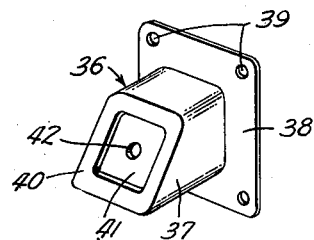
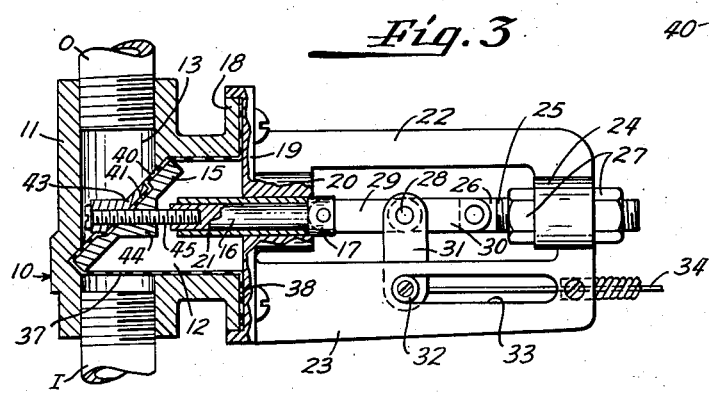
Inventor
Adolph G. Bergstrom
By
McCanna and Morsbach
Attys.

Patented Mar. 17, 1953

2,631,613

UNITED STATES PATENT OFFICE 2,631,613

SHUTOFF VALVE

Adolph G. Bergstrom, Rockford, Ill., assignor to Bergstrom Manufacturing Co., Rockford, Ill., a corporation of Illinois Application March 22, 1950, Serial No. 151,269

10 Claims. (Cl. 137—757)

The present invention relates to a remote control shut-off valve. Difficulty has been experienced with prior valves of this type because of sticking, leakiness, a tendency to snap to closed or fully open position from a partly open position, a similar tendency to work open when closed, and other operational defects. The valve of this invention eliminates such defects and provides other advantages over prior valve structures of this type.

The valve is disclosed herein as employed to control the circulation of hot water through an automobile heater, but of course the invention is applicable to many other purposes. Briefly, the valve of this invention comprises a valve plate carried by a plunger at an angle to the plunger axis. The plunger is movable longitudinally at right angles to a flow passage for engaging the valve plate on a correspondingly angled seat extending about the passage, to close the valve, or for withdrawing the plate substantially out of the passage to open the valve, or for disposing the plate at any desired position between fully open and closed positions. The plunger is actuated by a toggle linkage operated by a flexible cable which has one end disposed at a point convenient to an operator. To the common pivot of the toggle links is also pivoted one end of an operating link, the other end of which is restricted to movement in a path paralleling that of the plunger, as by a crosspin engaged in suitable slotted members. This end of the operating link is connected to the flexible cable so that it may be moved in either direction to open or close the valve by actuating the toggle links and plunger. A diaphragm having a central portion of cupped or hollow form is disposed in the valve body, and is of such size and shape as to extend across the flow passage in closed position of the valve. The diaphragm has an end wall portion angled to correspond to the valve plate, and is formed of flexible and preferably resilient material. The plate and plunger extend into the hollow of the diaphragm and the valve plate is secured to the angled wall portion so that the diaphragm will be extended or retracted as the plate is moved in one direction or the other. The diaphragm shields the working parts from the fluid and seals the valve body against leakage.

It is an object of this invention to provide a shut-off valve having novel means for effecting smooth, positive opening or closing thereof. Another object is the provision of a shut-off valve which will remain in any desired partially open position. A further object is the provision of a novel sealing diaphragm shielding all working parts of the valve from fluid in all positions thereof. It is an additional object to provide a shut-off valve so constructed that in fully open position the fluid passage is substantially unobstructed. Still another object is the provision of a valve having operating means which positively prevent working open of the valve from closed position. It is also an object of the invention to provide a valve including means permitting precise adjustment to assure exact seating in closed position.

Other and further objects, advantages, and features of the invention will be apparent to those skilled in the art from the following description, taken with the accompanying drawing, in which:

Figure 1 is a fragmentary elevational view of the valve of this invention applied to a hot water automobile heater;

Fig. 2 is an enlarged plan of the valve of Figure 1;

Fig. 3 is a side elevation, partly in section, of the valve of Fig. 2 in closed position;

Fig. 4 is a view similar to Fig. 3, but showing the valve in an open position, and Fig. 5 is a perspective view of the diaphragm employed in the valve.

Referring first to Figure 1, the valve, designated generally by the reference numeral 10, is shown as arranged to control the inlet line L of a hot water heater H of an automobile, the line L leading from the water jacket of the motor M and including inlet and outlet pipe sections designated I and O, respectively, the section I connecting the water jacket to the inlet of the valve 10. The control means for the valve is arranged for convenient operation from the dashboard D of the automobile, as is more fully explained below.

As best shown in Figs. 2 to 4 inclusive, the valve 10 comprises a hollow casing 11, a major portion of which is formed of generally trapezoidal shape in longitudinal section, with one end open and the opposite end defined by a wall extending at an angle of substantially 45° to the axis of this casing portion, which defines a valve chamber 12. The casing 11 also includes a portion defining a straight flow passage 13 of a diameter less than the width of the chamber 12 extending through the small end of the chamber at right angles to the chamber axis, the outlet end opening into the chamber through the inclined wall and the inlet end opening through the bottom or long wall. The inner surface of the inclined chamber wall provides a valve seat 14 extending about the passage 13 at a 45° angle to its axis, as clearly shown in Fig. 4. The pipe sections I and O are threadedly connected to the inlet and outlet ends, respectively, of the passage 13. A valve plate 15 is mounted for reciprocating movement longitudinally of the chamber 12 on one end of a plunger 16, the other end of which has an enlarged head 17. The axis of the plunger lies normal to the passage 13, and the plate is disposed at an angle of substantially 45° to the plunger axis so as to correspond to the inclination of the seat 14. About the open end of the chamber 12 is a flange 18 to which is secured a frame or bracket comprising a base plate 19 which serves as a wall member closing the chamber and attached to the flange by screws or the like. On its face outwardly of the chamber the plate 19 has a thickened portion or boss 20 through which extends a bore in which is slidably disposed a sleeve 21 of sufficient length to project into the chamber 12. The plunger 16 extends through the sleeve in slidable relation thereto, with its head 17 engageable with the outer end of the sleeve. The head is of a size to fit within the bore.

A bracket arm 22 extends from the plate 19, adjacent one side of the boss 20, in a direction opposite to the casing 11. A pair of supporting arms 23 also extend from the plate 19 adjacent the opposite side of the boss, generally parallel to each other and to the arm 22 and connected at their far ends in any suitable manner. At its far end the arm 22 is joined to the arms 23 by a connecting enlargement or boss 24 which may also serve as the connection between the two arms 23. The boss 24 is formed with a bore aligned with that of the boss 20, and a bolt 25 is disposed extending through the bore. The bolt has a flattened end portion 26 disposed between the boss 24 and the plate 19, and may be adjusted and locked in any desired position by a pair of nuts 27 engaging opposite faces of the boss. A toggle linkage extends between the bolt 25 and the plunger 16 for actuating the valve plate 15. The linkage comprises a common pivot 28 on which are pivoted adjacent ends of a toggle link 29, a pair of parallel toggle links 30, and a pair of operating links 31. The other end of the link 29 is pivoted to the plunger head 17, and the other ends of the links 30 are pivoted to the flat bolt end 26, while the other ends of the operating links are disposed between the arms 23 and carry a crosspin 32. The ends of the crosspin project into parallel closed slots 33 formed in the arms 23, fitting therein so as to be movable lengthwise of the slots without difficulty, but having no appreciable play crosswise of the slots. Rollers may be employed on the crosspin ends. The slots extend substantially parallel to the axis of the plunger 16. A flexible cable 34 of well known type has one end secured to the crosspin and extends between the far ends of the arms 23 to a convenient point on the automobile dashboard D (Fig. 1), where a suitable control button or knob 35 is attached to its other end. The links 29, 30 and 31 are so proportioned that in closed position of the valve the toggle links 29 and 30 are aligned with each other and with the bolt 25 and plunger 16, and the operating links 31 are normal thereto, the ends of the slots 33 nearer the plate 19 being so located as to be engaged by the crosspin when the links 31 are in their position normal to the aligned toggle links.

A diaphragm 36, clearly shown in Fig. 5, of hollow formation and substantially conforming to the chamber 12 in size and shape, is disposed in the chamber. The diaphragm is formed of material which is flexible and preferably resilient and resistant to damage by hot water, or by oil, anti-freeze compounds, or other substances which may be contained in the motor cooling system. "Neoprene" is the material employed in the disclosed embodiment. The hollow body 37 of the diaphragm has a flange 38 extending about its open end which is clamped between the casing flange 18 and the bracket base plate 19, being provided with suitable apertures 39 for the attaching screws. At the opposite end, the diaphragm body 37 is closed by an end wall 40 extending at an angle corresponding to that of the valve plate 15, and having a central depression 41 and an aperture 42. As will be evident from Figs. 3 and 4, the valve plate is disposed within the body 37 in engagement with the end wall 40, the diaphragm enclosing the valve plate as well as the portions of the plunger 16 and sleeve 21 extending into the chamber 12 and protecting these parts at all times from contact by the fluid in the passage 13 as well as sealing the casing against leakage. The wall 40 of the diaphragm is secured to the valve plate 15 by means of a clamping plate 43 which fits into the depression 41, which in turn is received in a suitable depression in the valve plate, to permit substantially uniform thickness in the plate assembly. Bores are provided in the plates 15 and 43 which are aligned with each other and with the plunger 16. A suitable projection or boss 44 is formed on the opposite face of the plate at the portion through which the bore extends to afford secure engagement for a bolt 45 extending through the bores and the aperture 42 of the diaphragm wall and threaded into the end of the plunger. The bore in the valve plate 15 is threaded for the bolt 45, and the bore in the clamp plate 43 may also be so threaded, to cause the bolt 45 to draw the plates together against the diaphragm wall 40, and also mount the valve plate securely on the plunger.

As will be clear from Figs. 3 and 4, in closed position of the valve the valve plate 15 extends at an angle across the passage 13 with the marginal portion of the diaphragm wall 40 sealingly engaging on the valve seat 14, and the longer of the diaphragm walls between the ends of which the wall 40 is inclined extending across the inlet portion of the passage 13. The passage is thus doubly closed. The diaphragm may be deflected somewhat by the fluid pressure, but any water which may enter about the diaphragm will find no outlet, and cannot reach any of the working parts of the valve. In open position of the valve, the valve plate is withdrawn substantially out of the passage 13, and the diaphragm 36 is retracted and loosely gathered or folded in the larger end of the chamber 12, between the valve plate and the base plate 18, so as not to interfere with flow through the passage. The same is true in partially open position of the valve, although in lesser degree, as will be obvious.

In some cases the larger end of the chamber 12 may be formed somewhat smaller than necessary to accommodate the valve plate entirely when the valve is fully opened, that is, when the valve plate cannot move any farther away from the seat 14, and therefore projects into the flow passage 13. The fact that the chamber is wider than the passage, however, results in water being able to flow along the sides of the chamber between the valve plate and seat, so that there is no appreciable diminution or obstruction of the flow. In other words, even if the valve plate projects into the flow passage to some extent, the cross-sectional area of the passage is not decreased because the portions of the chamber on each side of the passage provide additional space for flow of the water compensating for restriction of the passage by the valve plate. In cases where the valve plate is disposed entirely out of the passage in fully open position, of course, there is also a full, free, and unobstructed flow through the valve.

When the valve is closed, the valve plate and diaphragm are positioned as already described, and the toggle links 29 and 30 are aligned with each other and with the plunger 16 and bolt 25, the plunger and sleeve 21 projecting a considerable distance into the chamber 12. The operating links 31 extend normally to the aligned toggle links, with the crosspin engaging those ends of the slots 33 nearer the plate 19. To open the valve, it is only necessary to pull on the control knob 35 to move the crosspin 32 toward the farther ends of the slots. Since the lower ends of the links 31 are restricted to movement parallel to the plunger axis, the ends connected to the pivot 28 must move toward the slots, thus breaking the toggle and moving the plunger in a direction outwardly of the chamber 12, and unseating the valve plate 15 to open the valve. The movement may be continued until the valve plate has reached the limit of its opening movement, or may be terminated earlier to open the valve only partially, as may be desired. To close the valve, the action is reversed, the knob 35 being pushed back to cause the cable 34 to move the crosspin against the near ends of the slots, causing the links 31 to move the toggle links to their aligned position and thereby slide the plunger 16 inwardly of the chamber 12, thus urging the valve plate against the valve seat 14. In opening movement of the valve, the inner end of the sleeve 21 is engaged by the boss 44 of the valve plate and moved outwardly, while in closing movement the outer end of the sleeve is engaged by the head 17 of the plunger and moved inwardly of the chamber. The sleeve provides in effect an extension of the bore in the boss 20 to guide the plunger in the recess and maintain it against possible deflection, and also aids in reducing friction and wear.

The aligned position of the toggle links in closed valve position opposes the resistance of the boss 24 to any tendency of the valve plate to work open, and positively prevents such undesired opening. The toggle links are held against breaking by the disposition of the operating links 31 normal thereto, as explained. The links 31, of course, cannot move in a direction normal to the toggle links because of the restriction by the slots, and the crosspin ends thereof cannot move toward the plate 19 because of the slot ends, while movement toward the other ends of the slots is prevented by friction of the cable 34, which is sufficient to hold the links 31 in position under normal conditions. It may also be pointed out that the near ends of the slots 33 serve as stops to prevent overtravel of the links 31, which would result in opening of the valve after the valve plate had been brought to its closing position.

By means of the bolt 25 and its locking nuts 27, the valve plate 15 may be adjusted for precise seating on its valve seat, for the bolt may be moved toward or from the seat 14 as desired. In the same way, the bolt may be adjusted to compensate for wear at the various pivot points.

The distance the valve plate may move, or in other words, the throw of the plunger, may be varied in different valves by changing the dimensions or proportions of the links, as may be desirable or necessary.

The angled disposition of the valve plate permits the valve to operate at any desired partially open position without snapping closed or fully open, or creeping toward either extreme position, since the force lines of the water flowing through the valve act at an angle to the plunger. In other words, the effective pressure of the water on the valve plate is so reduced by the angularity of the plate that it is insufficient to move the valve plate in either direction. The arrangement of the valve plate at an angle is also advantageous in that it results in a gradual and progressive shutting off of the flow in closing of the valve.

The toggle arrangement provides a mechanism which gives a positive, smooth-working action in operating the valve, and prevents any snapping of the valve in opening or closing thereof. The toggle linkage also affords a relatively long movement of the plunger and the valve plate it carries in response to only a fairly short movement of the control knob.

Of course, many modifications of and changes in the disclosed embodiment may be made without departure from the inventive concept. Some of the possible variations have been suggested in the above description, but others will readily suggest themselves to those skilled in the art.

I claim:

1. A remote control shut-off valve comprising a hollow valve casing defining a flow passage and a chamber of greater width than said passage extending at right angles thereto and intersecting said passage, said passage being completely open to said chamber, a wall partially defining the intersection between said passage and said chamber and having an interior surface extending at an angle of 45° to the axis of said passage and defining a valve seat extending about the passage, a valve plate in said chamber disposed parallel to said surface, a plunger disposed in alignment with the axis of said chamber, a hollow smooth-walled diaphragm corresponding in size and shape to the interior of said chamber disposed therein and about said valve plate, means securing the angled face of said diaphragm to said valve plate and said valve plate to the adjacent end of said plunger, means supporting said plunger for longitudinal movement toward and away from said passage for respectively engaging said valve plate on said seat with said diaphragm extending across said passage and retracting the valve plate from the seat with said diaphragm gathered in folds, support means fixed relative to said casing and disposed in alignment with said plunger, a pair of toggle link elements adapted for alignment with each other and said plunger each having one end pivoted on a common pivot, one of said elements having its other end pivoted on said support means and the other of said elements having its other end pivoted on the other end of said plunger, said toggle link elements upon movement into said alignment moving said plunger toward said passage to seat said valve plate and upon disaligning movement moving the plunger from said passage to unseat the valve plate and when in said alignment maintaining said plunger against longitudinal movement, a bracket member extending from said casing, a closed slot in said member substantially parallel to said aligned toggle link elements, an operating link element having one end pivoted on said common pivot, means on the other end of said operating link element engaged in said slot, and means for moving said other operating link element end in one direction or the other along said slot to cause aligning or disaligning movement of said toggle link elements by said operating link element, said means on said other end of said operating link element abutting against one end of said slot and extending perpendicular to said toggle link elements in the aligned position of the latter.

2. A remote control shut-off valve comprising a hollow valve casing defining a chamber partially formed by a wall inclined to the axis of the chamber and having a first aperture in said inclined wall and a second aperture in another wall communicating with said first aperture, a smooth-walled diaphragm substantially conforming to the interior surface of said chamber and disposed therein, a plunger having an end projecting into said diaphragm, a valve plate carried by said end of the plunger disposed in said diaphragm parallel to said inclined wall and secured to the correspondingly inclined wall portion of the diaphragm, means supporting said plunger for longitudinal movement toward and away from said inclined wall to engage therewith and disengage therefrom said inclined diaphragm wall portion for closing and opening said first aperture, a support fixed relative to said casing and aligned with said plunger, a pair of toggle link elements each having one end pivoted on a common pivot, one of said elements having its other end pivoted to the other end of said plunger and the other element having its other end pivoted to said fixed support, link means having one end pivoted on said common pivot, means restricting the other end of said link means to movement parallel to said plunger between opposed limiting positions, and means connected to said link means operable from a point remote from said valve to move said other end of the link means in one or the other direction for moving said link elements toward or from alignment to cause movement of said plunger toward or from said inclined wall, said link means in one limiting position extending perpendicular to said link elements to maintain the latter in alignment for holding said diaphragm wall closing said first aperture in the valve casing until movement of said other end of said link means toward its other limiting position.

3. A remote control shut-off valve comprising a hollow valve casing defining a chamber of generally trapezoidal shape in longitudinal section having a first aperture in a wall thereof inclined to the axis of the chamber and a second aperture in another wall communicating with said first aperture a plunger reciprocable into said chamber, a valve plate in said chamber disposed parallel to said inclined wall and carried by said plunger, means supporting said plunger for longitudinal movement toward and away from said inclined wall to engage said plate against the inclined wall for closing said first aperture and to move said plate from said wall for opening said aperture, a support fixed relative to said casing and aligned with said plunger, a pair of toggle link elements each having one end pivoted on a common pivot, one of said elements having its other end pivoted to said plunger and the other element having its other end pivoted to said support, link means pivoted on said common pivot, means restricting the other end of said link means to movement between opposed limiting positions, and operating means connected to said link means operable from a point remote from said valve for moving the link means in one or an opposite direction to move said link elements toward or from alignment for causing movement of said plunger toward or from said inclined wall, said operating means in one limiting position of said link means being operative to maintain the latter in a position forcing said toggle link elements to position said plunger holding said valve plate closing said first aperture in the valve casing.

4. A remote control shut-off valve comprising a hollow valve casing defining a chamber partially formed by a wall inclined to the axis of the chamber and having a first aperture in said inclined wall and a second aperture in another wall communicating with said first aperture, a smooth-walled diaphragm disposed in said chamber and substantially conforming thereto, a plunger having an end projecting into said diaphragm, a valve plate carried by said end of the plunger disposed in said diaphragm parallel to said inclined wall and secured to a correspondingly inclined wall portion of the diaphragm, means supporting said plunger for longitudinal movement toward and away from said inclined wall to engage therewith and disengage therefrom said inclined diaphragm wall portion for closing and opening said first aperture and to extend another portion of said diaphragm across and withdraw the other diaphragm portion from said second aperture for closing and opening said second aperture, a support fixed relative to said casing and aligned with said plunger, a pair of toggle link elements each having one end pivoted on a common pivot, one of said elements having its other end pivoted to the other end of said plunger and the other element having its other end pivoted to said support, link means having one end pivoted on said common pivot, means restricting the other end of said link means to movement parallel to said plunger between opposed limiting positions, and means connected to said link means operable from a point remote from said valve to move said other end of the link means in one or the other direction for moving said toggle link elements toward or from alignment to cause movement of said plunger toward or from said inclined wall, said link means in one of its limiting positions extending perpendicular to said toggle link elements when the latter are in alignment to maintain said inclined diaphragm wall closing said first aperture in the valve casing.

5. A shut-off valve structure comprising a hollow valve casing defining a chamber and a flow passage opening into said chamber, a valve seat extending about said passage at said opening, a valve stem having at least an end thereof disposed in said chamber and extending toward said opening, a valve member carried by said valve stem end and adapted to seat on said valve seat and to enter said chamber upon longitudinal movement of said stem respectively toward and from said opening, means mounting said valve stem for longitudinal movement in said chamber toward and from said opening, a support fixed relative to said casing disposed in alignment with said stem and spaced from the other end thereof, a pair of toggle link elements each having one end pivoted on a common pivot, one of said link elements having its other end pivoted to said other end of the valve stem and the other link element having its other end pivoted to said support, an operating link element having one end pivoted on said common pivot, means restricting movement of the other end of said operating link element to a path parallel to the axis of said plunger, means for moving said other operating link element end in one direction or the other along said path to cause said operating link element to move said toggle link elements into and out of alignment with each other and said valve stem to impart longitudinal movement to said stem toward and from said opening, said operating link element extending normal to said toggle link elements upon movement thereof into said alignment, and stop means for terminating movement of said operating link element in said one direction upon said disposition thereof normal to said aligned toggle link elements, said means for moving said other operating link element end being operative in said position of said operating link normal to said aligned toggle link elements to resiliently bias the latter to said normal position to maintain said valve member seated against said valve seat.

6. A shut-off valve comprising a hollow valve casing defining a chamber partially formed at one end by a wall inclined at an angle to the axis of said chamber, said casing also defining a flow passage normal to the axis of said chamber and divided by the chamber to define a first opening in said inclined wall and a second opening in another wall of said chamber, said inclined wall defining a valve seat about said first opening, a diaphragm of flexible material conforming to the interior of said chamber and disposed therein, a valve stem normal to said passage having at least an end thereof disposed in said diaphragm, a valve plate carried by said end of said valve stem disposed in said diaphragm parallel to said inclined wall and having secured thereto the correspondingly inclined diaphragm portion, said valve plate and diaphragm being disposable in the other end of said chamber, and means supporting said valve stem for longitudinal movement toward and from said inclined wall to project and retract said valve plate out of and into said other end of said chamber for closing and opening said passage, said valve plate when projected disposing said inclined diaphragm portion in engagement with said valve seat and simultaneously disposing the portion of said diaphragm conforming to said other wall in a position across said second opening, and when retracted disposing said diaphragm portions substantially within said other chamber end to leave said passage substantially unobstructed.

7. A shut-off valve comprising a hollow valve casing defining a chamber partially formed at one end by a wall inclined at an angle to the axis of said chamber, said casing also defining a flow passage extending normal to the chamber axis and divided by said chamber to define a first opening in said inclined wall and a second opening in another wall, said inclined wall providing a valve seat about said first opening, a valve stem disposed axially in said chamber and reciprocable therein toward and away from said valve seat, a valve member in said chamber carried parallel to said inclined wall by said valve stem end, a pair of toggle link elements movable into alignment for moving said valve stem toward said inclined wall to move said valve member between fully open position substantially out of said passage and closed position in engagement with said valve seat and also movable out of alignment for moving said stem from the inclined wall to cause reverse movement of said valve member between said closed and open positions, said link elements being disposable in any of graduatedly disaligned positions to cause disposition of said valve member in any of graduatedly open positions between said closed and fully open positions corresponding to the disaligned link element positions, and means operable to move said link elements into and out of alignment, said last-mentioned means including means operative to exert a force against said link elements acting to maintain the valve in the closed or partly open position in which it is disposed, said valve member being maintained by said inclination against movement from its partially open position by fluid flowing in said passage, said inclination causing reduction of the effective pressure of said fluid acting axially of said valve stem to a value below that required to cause such movement.

8. A valve comprising a seat interposed between inlet and outlet ports, a closure member operative to engage said seat to block the flow of fluid through said valve and to be retracted away from said seat, a reciprocable stem controlling the position of said closure member, a pair of toggle link elements pivoted to each other at one end each and adapted to extend in alignment with one another, one of said toggle link elements having its other end pivoted to said valve stem and the other of said toggle link elements having its other end pivoted to a fixed support, said toggle link elements being operative upon movement into alignment with each other to move said stem to actuate said closure member to seat against said valve seat and upon movement out of alignment with each other to move said stem to actuate said closure member to retracted position away from said valve seat, support means defining a slot which is closed at one end at least and which extends parallel to the path of reciprocation of said stem, an operating link pivoted to the common pivot of said toggle link elements and formed with a pin spaced from said pivot which is slidably received within said slot, said operating link when positioned with its pin abutting against said closed end of said slot positioning said common pivot of the toggle link elements to maintain the latter in alignment and extending perpendicular to the aligned toggle link elements, and means exerting a force on said operating link to maintain the latter in said position for holding the valve closure member seated against the valve seat.

9. A valve comprising a valve casing defining a passage and an intersecting chamber, an annular wall defining the intersection of said passage and chamber extending around said passage and inclined at an acute angle thereto to provide a valve seat inclined angularly to the path of fluid through said passage, said casing being formed with an inlet to said passage which communicates with said chamber ahead of said valve seat, and a diaphragm reciprocable in said chamber and at its forward end being rigidly shaped complementary to said valve seat to snugly abut thereagainst in one extreme limit of movement of the diaphragm, said diaphragm in said extreme limit of movement presenting a side wall extending across said inlet to block the flow of fluid therefrom ahead of said valve seat.

10. The valve of claim 9, wherein said chamber is formed with a larger cross-sectional area than said passage at their intersection to permit substantially normal flow of fluid when said diaphragm is only partially retracted from its position extending across said inlet.

ADOLPH G. BERGSTROM.

REFERENCES CITED

The following references are of record in the file of this patent:

UNITED STATES PATENTS

| Number | Name | Date |
|---|---|---|
| 237,854 | Garsed | Feb. 15, 1881 |
| 760,595 | Wiesebrock | May 24, 1904 |
| 1,779,503 | Swindin | Oct. 28, 1930 |

FOREIGN PATENTS

| Number | Country | Date |
|---|---|---|
| 154,001 | Germany | Sept. 13, 1904 |
| 239,020 | Great Britain | Sept. 3, 1925 |